United States Patent [19]

Humphrey, Jr.

[11] 4,232,088

[45] Nov. 4, 1980

[54] POLYCARBONATE ARTICLES COATED WITH AN ADHERENT, DURABLE ORGANOPOLYSILOXANE COATING AND PROCESS FOR PRODUCING SAME

[75] Inventor: James S. Humphrey, Jr., Clemmons, N.C.

[73] Assignee: General Electric Company, Pittsfield, Mass.

[21] Appl. No.: 26,059

[22] Filed: Apr. 2, 1979

Related U.S. Application Data

[63] Continuation-in-part of Ser. No. 895,789, Apr. 12, 1978, abandoned.

[51] Int. Cl.$^2$ ............................. B05D 3/06; B05D 1/38; B32B 27/08; B32B 27/16
[52] U.S. Cl. ............................. 428/412; 427/54.1
[58] Field of Search ..................... 427/54; 428/412

[56] References Cited

U.S. PATENT DOCUMENTS

| | | | |
|---|---|---|---|
| 2,976,184 | 3/1961 | Blatz | 427/387 X |
| 3,379,607 | 4/1968 | Foster et al. | 428/447 |
| 3,451,838 | 6/1969 | Burzynski et al. | 428/451 X |
| 3,650,808 | 3/1972 | Gagnon | 428/412 |
| 3,661,685 | 5/1972 | Osteen | 428/412 X |
| 3,681,167 | 8/1972 | Moore | 428/412 X |
| 3,707,397 | 12/1972 | Gagnon | 428/412 |
| 3,968,305 | 7/1976 | Oshima et al. | 428/412 X |
| 3,968,309 | 7/1976 | Matsuo et al. | 428/409 |
| 3,978,178 | 8/1976 | Oshima et al. | 264/25 |
| 3,986,997 | 10/1976 | Clark | 428/412 X |
| 4,026,826 | 5/1977 | Yoshida et al. | 260/25 |
| 4,027,072 | 5/1977 | Molari | 428/412 |
| 4,027,073 | 5/1977 | Clark | 428/412 |
| 4,041,120 | 8/1977 | Oshima | 264/171 |
| 4,045,602 | 8/1977 | Sommer et al. | 427/386 |
| 4,064,286 | 12/1977 | Hahn | 427/54 X |
| 4,103,065 | 7/1978 | Gagnon | 428/412 X |

*Primary Examiner*—James R. Hoffman
*Attorney, Agent, or Firm*—William F. Mufatti

[57] ABSTRACT

A coated polycarbonate article comprising a polycarbonate substrate having (i) a primer layer containing a UV cured reaction product of (a) a polyfunctional acrylic ester monomer, (b) an organic silicon compound represented by the formula $R^4{}_c SiX_{4-c}$ wherein $R^4$ is an organic group containing olefinic unsaturation, X is an alkoxy, acyloxy, and aryloxy group, and c is an integer of from 1 to 3, and (c) an acrylate modified polymer; and (ii) a thermoset organopolysiloxane coating on said UV cured primer layer.

A process for producing a coated polycarbonate article comprising (i) priming a polycarbonate substrate with a UV curable primer composition containing (a) a polyfunctional acrylic acid ester monomer, (b) an organic silicon compound represented by the formula $R^4{}_c SiX_{4-c}$, wherein $R^4$, X and c are as defined above, (c) an acrylate modified polymer, and (d) a UV photoinitiator; (ii) UV curing said primer composition; (iii) applying an organopolysiloxane coating composition to the primed substrate; and (iv) curing the organopolysiloxane.

29 Claims, No Drawings

POLYCARBONATE ARTICLES COATED WITH AN ADHERENT, DURABLE ORGANOPOLYSILOXANE COATING AND PROCESS FOR PRODUCING SAME

This application is a continuation in part of copending application Ser. No. 895,789, filed Apr. 12, 1978, now abandoned.

This invention relates to transparent organopolysiloxane coated polycarbonate articles wherein the polysiloxane is tenaciously adhered to the polycarbonate substrate and to a process for producing such an article. More particularly, the present invention relates to an organopolysiloxane coated polycarbonate article having a primer layer between the polycarbonate and the organopolysiloxane comprising the UV light cured reaction product of a polyfunctional acrylic acid ester monomer, a certain organo silicon compound, and an acrylate modified polymer. The process for producing said article comprises priming the polycarbonate substrate with an adhesion promoting, thermosettable primer composition comprised of a polyfunctional acrylic acid ester monomer, a specific organic silicon compound, an acrylate modified polymer, and a photocure initiator by forming a thin film thereon; curing said primer film by exposure to ultraviolet light; coating the primed surface with a coating composition containing a further curable organopolysiloxane; and finally curing said further curable organopolysiloxane.

BACKGROUND OF THE INVENTION

The use of transparent glazing material utilizing polycarbonate resin as a structural component for windows, windshields, and the like are well known. While these polycarbonate resins are easily fabricated into the desired shape and have excellent physical and chemical properties, such as being less dense than glass and having more breakage resistance than glass, their abrasion, scratch and mar resistance is relatively low.

In order to overcome this relatively low scratch and mar resistance, various coatings have been applied to these polycarbonate resins. U.S. Pat. Nos. 3,451,838, 3,986,997, and 4,027,073 disclose a coating composition and technique for the application of organopolysiloxane coatings onto these surfaces. While these coatings have many desirable properties, e.g., they are hard, mar-resistant, scratch-resistant, and chemical solvent resistant, these organopolysiloxane coatings do not in all instances possess the desired degree of uniform adherence to and durability on the polycarbonate surfaces. There is a need for polycarbonate articles having uniformly, tenaciously and durably adhered scratch, mar, and chemical or solvent resistant coatings thereon, and it is a primary object of the present invention to provide such articles and a relatively simple and economical process for producing these articles.

DESCRIPTION OF THE INVENTION

This invention relates to organopolysiloxane coated polycarbonate articles having an adhesion promoting primer layer and to a process for producing these articles.

In the practice of the present invention, prior to the application of the organopolysiloxane coating to the polycarbonate surface, the surface is first primed by the application of a UV curable primer composition containing (a) a polyfunctional acrylic ester monomer, (b) an organo silicon compound, (c) an acrylate modified polymer, and (d) a UV photoinitiator. This primer composition is cured by exposure to UV light, and then the organopolysiloxane coating is then applied thereon. The aromatic carbonate polymer of the instant invention has recurring units of the formula

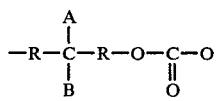
I.

wherein each —R— is selected from the group consisting of phenylene, halo-substituted phenylene and alkyl substituted phenylene; and A and B are each selected from the group consisting of hydrogen, hydrocarbon radicals free from aliphatic unsaturation and of radicals which together with the adjoining

atom form a cycloalkane radical, the total number of carbon atoms in A and B being up to 12.

The aromatic carbonate polymer of this invention may be prepared by methods well known in the art and as described in U.S. Pat. No. 3,989,672, all of which are incorporated by reference.

Also, included herein are branched polycarbonates wherein a polyfunctional aromatic compound is reacted with the dihydric phenol and carbonate precursor to provide a thermoplastic randomly branched polycarbonate wherein the recurring units of formula I contain branching groups.

The preferred polycarbonate resins may be derived from the reaction of bisphenol-A and phosgene. These polycarbonates have from 10–400 recurring units of the formula:

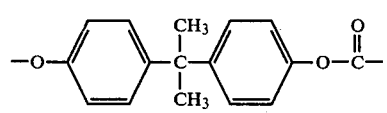
II.

The polycarbonate should have an intrinsic viscosity between 0.3 and 1.0, preferably from 0.40 to 0.65 as measured at 25° C. in methylene chloride. The UV curable primer composition comprises: (i) a polyfunctional acrylic ester monomer; (ii) a certain organic silicon compound; (iii) an acrylate modified polymer; and, (iv) a UV photoinitiator. The polyfunctional acrylic ester monomers of the present invention are represented by the general formula

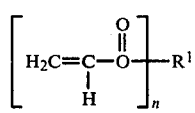
III.

wherein n is an integer from 2 to 8, preferably from 2 to 6, and more preferably from 2 to 4, inclusive; and, $R^1$ is an n valent saturated aliphatic hydrocarbon radical, n valent substituted saturated aliphatic hydrocarbon radical, n valent ether radical, n valent polyether radical, n valent substituted ether radical, n valent substituted polyether radical, n valent olefinically unsaturated aliphatic hydrocarbon radical, n valent substituted olefinically unsaturated aliphatic hydrocarbon radical, n valent aromatic hydrocarbon radicals, and n valent substituted aromatic hydrocarbon radicals.

By n valent saturated aliphatic hydrocarbon radicals is meant n valent radicals derived from saturated aliphatic hydrocarbons, i.e., alkanes by removal of n hydrogens therefrom. Preferred n valent saturated aliphatic hydrocarbon radicals are those containing from 1 to about 20 carbon atoms. Some non-limiting examples of these preferred n valent saturated aliphatic hydrocarbon radicals include

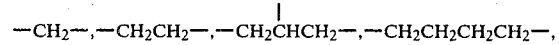

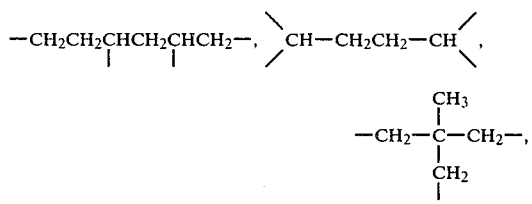

and the like.

These n valent saturated aliphatic hydrocarbon radicals may contain substituent groups thereon. Preferred n valent substituted saturated aliphatic hydrocarbon radicals are those containing from 1 to about 20 carbon atoms. These preferred n valent substituted saturated aliphatic hydrocarbon radicals can contain substituent groups such as the halogens, i.e., fluorine, chlorine, bromine and iodine, hydroxyl, $-COOR^2$, $-OR^2$, $-CN$, $-COOH$, $-NO_2$, $-NH_2$, and $-NR^2$ wherein $R^2$ represents alkyl radicals containing from 1 to about 6 carbon atoms. Some non-limiting examples of n valent substituted saturated aliphatic hydrocarbon radicals include

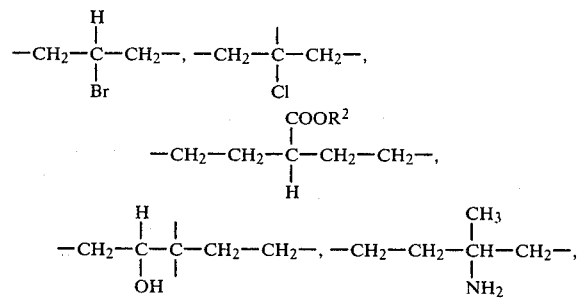

and the like.

By n valent olefinically unsaturated aliphatic hydrocarbon radicals is meant n valent radicals derived from olefinically unsaturated aliohatic hydrocarbons, i.e., alkens by removal of n hydrogens therefrom. Preferred n valent olefinically unsaturated aliphatic hydrocarbon radicals are those containing from 2 to about 20 carbon atoms. Some non-limiting examples of these radicals include $-CH=CH-$, $-CH_2-CH=CH-CH_2-$,

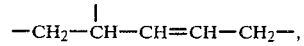

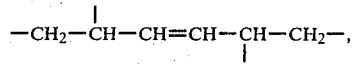

$>CH-CH=CH-CH<$, and the like.

These n valent olefinically unsaturated aliphatic hydrocarbon radicals may contain substituent groups thereon. Preferred n valent substituted olefinically unsaturated aliphatic hydrocarbon radicals are those containing from 2 to about 20 carbon atoms. These radicals can contain substituent groups such as the halogens, $-COOR^2$, $-OR^2$, $-CN$, $-COOH$, $-NO_2$, $-NH_2$, and $-NR^2$ wherein $R^2$ is as defined above. Some non-limiting examples of n valent substituted olefinically unsaturated aliphatic hydrocarbon radicals include

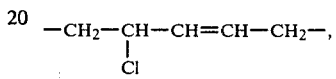

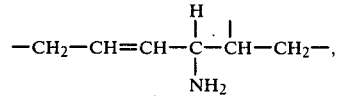

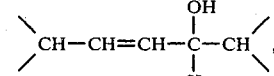

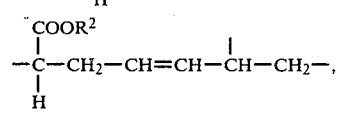

and the like.

By n valent ether radicals is meant n valent radicals derived from ethers by removal of n hydrogens therefrom. Preferred n valent ether radicals are those containing from 2 to about 20 carbon atoms. Some non-limiting examples of these n valent ether radicals include $-CH_2-O-CH_2-$, $>CH-CH_2-O-CH_2-CH<$,

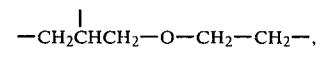

and the like.

These n valent ether radicals may contain substituent groups thereon. Preferred n valent substituted ether radicals are those containing from 2 to about 20 carbon atoms. These radicals can contain substituent groups such as the halogens, $-COOR^2$, $-OR^2$ $-CN$, $-COOH$, $-NO_2$, $-NH_2$, and $-NR^2$ wherein $R^2$ is as defined above. Some non-limiting examples of n valent substituted ether radicals include

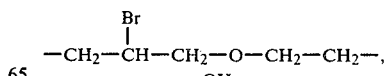

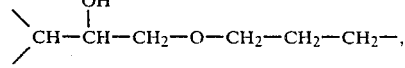

-continued

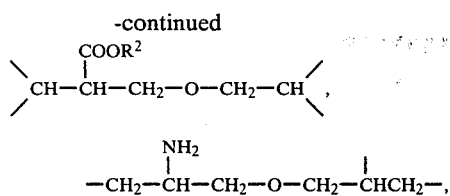

and the like.

By n valent polyether radicals is meant n valent radicals derived from polyethers, which polyethers are represented by the general formula $-(R^3O)_x-$ wherein x is an integer from 2 to about 5 and $R^3$ is a lower alkyl, by removal of n hydrogens therefrom. Preferred n valent polyether radicals are those containing from 3 to about 20 carbon atoms. Some non-limiting examples of these n valent polyether radicals include $-CH_2-CH_2-O-CH_2CH_2-O-CH_2CH_2-$, $>CH-CH_2-O-CH_2CH_2-O-CH_2CH<$, $-CH_2-O-CH_2-O-CH_2-$,

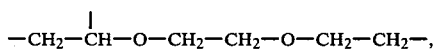

and the like.

These n valent polyether radicals may contain substituent groups such as halogens, hydroxyl, $-COOR^2$, $-CN$, $-COOH$, $-NO_2$, $-NH_2$, and $-NR^2$ thereon. Some non-limiting examples of these n valent substituted polyether radicals include

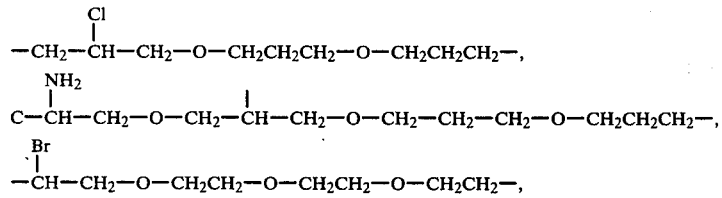

and the like.

By n valent aromatic hydrocarbon radicals is meant n valent radicals derived from aromatic hydrocarbons, e.g., benzene, naphthalene and anthracene, by removal of n hydrogens therefrom. Preferred n valent aromatic hydrocarbon radicals are those containing from 6 to 18 carbon atoms. Some non-limiting examples of these preferred n valent saturated aliphatic hydrocarbon radicals include

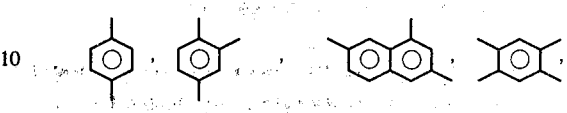

and the like. These n valent aromatic hydrocarbon radicals may further contain substituent groups such as halogens, lower alkyls, hydroxyl, $-COOR^2$, $-COOH$, $-NH_2$, $-NO_2$, $-OR^2$, and $-CN$ thereon.

It is to be understood that where substituent groups are present, they should be such that they do not unduly hinder or interfere with the photocure of the polyfunctional acrylic monomers.

In the practice of the present invention, it is preferred that $R^1$ be a n valent saturated aliphatic hydrocarbon radical, a n valent ether radical, or a n valent polyether radical.

More particularly, the difunctional acrylic monomers, or diacrylates, are represented by formula III wherein n is 2; the trifunctional acrylic monomers, or triacrylates, are represented by formula III wherein n is 3; and, the tetra-functional acrylic monomers, or tetraacrylates, are represented by formula III wherein n is 4.

Illustrative of suitable polyfunctional acrylate ester monomers of formula III are those listed below in TABLE I.

TABLE I

Diacrylates of Formula III

1. $CH_2=CHCOO-CH_2-OOCCH=CH_2$
2. $CH_2=CHCOO-CH_2-CH_2-OOCCH=CH_2$
3. $CH_2=CHCOO-CH_2-CHOHCH_2-OOCCH=CH_2$
4. $CH_2=CHCOO-(CH_2)_6-OOCCH=CH_2$
5. $CH_2=CHCOO-CH_2-CH_2-CH-CH_3$
   $\qquad\qquad\qquad\qquad\quad |$
   $\qquad\qquad\qquad\qquad OOCCH=CH_2$
6. $CH_2=CHCOO-CH_2CH_2OCH_2CH_2=OOCCH-CH_2$
7. $CH_2=CHCOO-CH_2CH_2OCH_2CH_2OCH_2CH_2OCH_2CH_2-OOCCH=CH_2$
8. $\qquad\qquad\qquad\qquad CH_3$
   $\qquad\qquad\qquad\qquad |$
   $CH_2=CHCOO-CH_2-C-OOCCH=CH_2$
   $\qquad\qquad\qquad\qquad |$
   $\qquad\qquad\qquad\qquad CH_3$
9. $\qquad\qquad\qquad\qquad CH_2Br$
   $\qquad\qquad\qquad\qquad |$
   $CH_2-CHCOO-CH_2-C-OOCCH=CH_2$
   $\qquad\qquad\qquad\qquad |$
   $\qquad\qquad\qquad\qquad CH_3$
10. $\qquad\qquad\qquad\qquad CH_2OH$
    $\qquad\qquad\qquad\qquad |$
    $CH_2=CHCOO-CH_2-C-OOCCH=CH_2$
    $\qquad\qquad\qquad\qquad |$
    $\qquad\qquad\qquad\qquad CH_3$ TABLE I-continued 11.  
$$CH_2-CHCOO-CH_2-\underset{\underset{CH_2OH}{|}}{\overset{\overset{CH_2OH}{|}}{C}}-OOCCH=CH_2$$

12.  
$$CH_2=CHCOO-CH_2-\underset{\underset{CH_2Br}{|}}{\overset{\overset{CH_2OH}{|}}{C}}-OOCCH=CH_2$$

13. $CH_2=CHCOO-CH_2-CH=CH-CH_2-CH_2-OOCCH=CH_2$

14. $$CH_2=CHCOO-CH_2-CH=CH-\underset{\underset{CH_2OH}{|}}{CH}-OOCH=CH_2$$

15.  
$$CH_2=CHCOO-CH_2-\underset{\underset{CH_2Cl}{|}}{\overset{\overset{CH_2OH}{|}}{C}}-CH_2OOCCH=CH_2$$

16. $$CH_2=CHCOO-CH_2-\underset{\underset{OCH_3}{|}}{CH}-CH_2-OOCCH=CH_2$$

17. $CH_2=CHCOO-\phantom{x}\bigcirc\phantom{x}-OOCCH=CH_2$

18. $CH_2=CHCOO-\phantom{x}\bigcirc^{CH_3}\phantom{x}-OOCCH=CH_2$

19. $CH_2=CHCOO-\phantom{x}\bigcirc^{Br}\phantom{x}-OOCCH=CH_2$

20. $CH_2=CHCOO-\phantom{x}\bigcirc^{OH}\phantom{x}-OOCCH=CH_2$

21. $CH_2=CHCOO-CHCH_2CH_2-OOCCH=CH_2$ (with phenyl substituent)

22. $$CH_2=CHCOO-CH_2CH_2CH_2CH_2-\underset{\underset{}{}}{\overset{\overset{OOCCH_3}{|}}{}}-OOCCH=CH_2$$

Triacrylates of Formula III

23.  
$$\begin{array}{c}CH_2=CHCOO-CH_2\\CH_2=CHCOO-CH_2-C-CH_2-CH_3\\CH_2=CHCOO-CH_2\end{array}$$

24.  
$$CH_2=CHCOO-CH_2-\underset{\underset{CH_2-OOCCH=CH_2}{|}}{\overset{\overset{CH_2OH}{|}}{C}}-CH_2-OOCCH=CH_2$$

25. $CH_2=CHCOO-\phantom{x}\bigcirc\phantom{x}-OOCCH=CH_2$ (with OOCCH=CH₂ substituent)

Tetraacrylates of Formula III

26.  
$$\begin{array}{c}CH_2=CHCOO-CH_2\\CH_2=CHCOO-CH_2-C-CH_2-OOCCH=CH_2\\CH_2-CHCOO-CH_2\end{array}$$

27. $CH_2=CHCOO-CH_2\phantom{xx}CH\phantom{x}CH\phantom{x}CH_2-OOCCH=CH_2$
$\phantom{27.}\phantom{xx}CH_2=CHOO-CH_2CH_2-OOCCH=CH_2$ TABLE I-continued 28.
$$CH_2=CHCOO-CH_2\underset{\underset{CH_2=CHCOO-CH_2}{|}}{CH}\overset{\overset{OH}{|}}{CH}-CH_2\underset{\underset{CH_2-OOCCH=CH_2}{|}}{CH}-OOCCH=CH_2$$

These polyacrylate esters and their production are well known to those skilled in the art. One method of producing the di-, tri-, and tetraacrylate esters involves reacting acrylic acid with a di-, tri-, or tetrahydroxyl compound to produce the diester, triester, or tetraester. Thus, for example, acrylic acid can be reacted with ethylene glycol to produce ethylene glycol diacrylate (compound 2 in Table I).

It is to be understood that the instant primer compositions may contain only one polyfunctional acrylic acid ester monomer or a mixture of two or more, preferably two, different monomers. In certain instances, it is preferred that the primer compositions contain mixtures of two or more, preferably two, different monomers.

The organic silicon compounds of the present invention are represented by the formula $$R^4_c SiX_{4-c} \qquad (IV)$$

wherein X independently represents an alkoxy, acyloxy and aryloxy group, $R^4$ represents an organic group containing olefinic unsaturation, and c is an integer from 1 to 3.

Preferred alkoxy groups are those containing from 1 to about 10 carbon atoms. Exemplary preferred alkoxy groups include methoxy, propoxy, butoxy, pentoxy, heptoxy, and the like. Preferred acyloxy groups are those containing from 2 to about 10 carbon atoms. Exemplary preferred alkoxy groups include acetoxy, propionoxy, butyroxy, pentanoxy, hexanoxy, and the like. The preferred aryloxy group is phenoxy.

$R^4$ represents an organic group containing olefinic unsaturation such that the compound of formula IV will co-react with the polyfunctional acrylic acid ester monomer and with the acrylate modified polymer upon exposure to UV light and in the presence of a UV photoinitiator to form a thermoset reaction product which improves the adhesion of an organopolysiloxane to the polycarbonate substrate. More particularly, $R^4$ is a radical represented by the formula $$CH_2=\underset{\underset{H}{|}}{\overset{\overset{Y}{|}}{C}}-\overset{\overset{O}{\|}}{C}-O-R^5- \qquad V.$$

wherein $R^5$ is a divalent saturated aliphatic hydrocarbon radical, preferably containing from 1 to about 12 carbon atoms and, more preferably, containing from 2 to about 6 carbon atoms, and Y is hydrogen or methyl; and a maleamic acid radical represented by the formula $$\begin{array}{c} O \\ \| \\ C \quad H \\ / \quad \backslash \; | \\ HC \qquad N-R^5- \\ \| \\ HC \qquad OH \\ \backslash \quad / \\ C \\ \| \\ O \end{array} \qquad VI.$$

wherein $R^5$ is as defined above. Some non-limiting examples of $R^5$ include $-CH_2CH_2-$, $-CH_2-CH_2-CH_2-$, $$-CH_2-\underset{\underset{CH_3}{|}}{\overset{\overset{CH_3}{|}}{C}}-CH_2-,$$

and the like.

The primer compositions of the instant invention may contain only one type of organic silicon compound of formula IV or they may contain mixtures of two or more, but preferably two, different organic silicon compounds. Thus, for example, the primer compositions may contain two different compounds of formula V, two different compounds of formula VI, or one compound of formula V and one compound of formula VI.

The third component of the coating compositions of the present invention is an acrylate modified polymeric resin. The acrylate modified polymeric resins are conventional polymer types whose structure and preparation are known in the art. These acrylate modified polymers have UV reactive acrylate groups incorporated into the polymer. Generally, these acrylate modified polymers are represented by the general formula $$\text{Polymer-[Acrylate]}_m, \qquad (VII)$$

wherein m is an integer of from 1 to about 5 and Polymer is a m valent polymeric material, and Acrylate is a mono-, di-, tri-, or tetaacrylate group. Thus, a difunctional polymer, wherein m is 2, would have a structure represented by the formula $$\text{Acrylate—Polymer—Acrylate,} \qquad (VIII)$$

a trifunctional polymer, wherein m is 3, would have the structure represented by the formula $$\begin{array}{c} \text{Acrylate—Polymer—Acrylate ,} \\ | \\ \text{Acrylate} \end{array}$$

and so forth.

Thus, a polymer having monofunctional acrylates attached thereto would be represented by the formula $$\text{Polymer}\left[-O-\overset{\overset{O}{\|}}{C}-CH=CH_2\right]_1 \qquad IX.$$

wherein Polymer and 1 are as defined above. A polymer having polyfunctional acrylates attached thereto would be represented by the formula $$\text{Polymer}\left(-R^1-\left[-O-\overset{\overset{O}{\|}}{C}-CH=CH_2\right]_n\right)_m \qquad X.$$

wherein Polymer, $R^1$, n, and m are as defined above.

Polymers having both monofunctional and polyfunctional acrylate groups attached thereto are also useful in the practice of the present invention. These types of acrylate modified polymers are represented by the structural formula

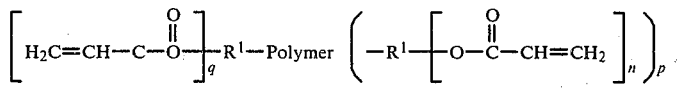

wherein Polymer, $R^1$, and n are as defined above, and q and p are integers having a value of from 1 to 3, provided that the sum of q+p does not exeed 5.

Exemplary typical acrylate modified polymers, wherein the acrylate is a monoacrylate, are acrylate polyesters represented by the formula

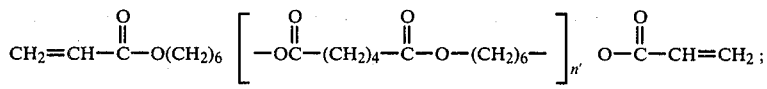

acrylate epoxies represented by the formula

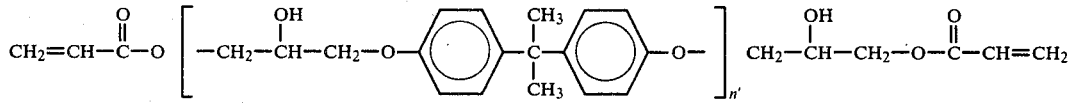

and acrylate urethanes represented by the formula

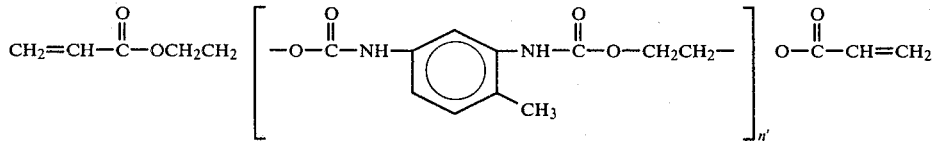

Preferred acrylate modified polymers are the acrylate epoxies as described in U.S. Pat. No. 3,586,526, acrylate urethanes as described in U.S. Pat. No. 3,297,745, acrylate alkyl urethanes as described in U.S. Pat. No. 3,673,140, acrylate polycaprolactones as described in U.S. Pat. No. 3,700,643, acrylate unsaturated acid modified drying oils as described in U.S. Pat. No. 3,712,871, acrylate polyesters, and acrylate polyethers as described in U.S. Pat. No. 3,380,831, said references being incorporated herein by reference.

Generally, the primer compositions of the present invention contain a ratio, by weight, of acrylate polyfunctional acrylic acid ester monomer to acrylate modified polymer of from about 1:10 to about 10:1, preferably from about 1:2 to about 2:1. The amount of polyfunctional acrylic acid ester monomer plus acrylate modified polymer present in the primer compositions is generally from about 10 to about 80 weight percent, preferably from about 20 to about 40 weight percent, while the amount of organic silicon compound present is generally from about 20 to about 90 weight percent, preferably from about 40 to about 80 weight percent.

The photocurable primer compositions also contain a photo-initiating amount of photoinitiator, i.e., an amount effective to effect the photocure of the coating composition. Generally, this amount is from about 0.01% to about 10% by weight, preferably from about 0.1% to about 5% by weight of the photocurable primer composition, exclusive of any solvent present.

These additives and the cure thereof are generally well known in the art. Some non-limiting examples of these UV radiation photosensitizers include ketones, such as benzophenone, acetophenone, benzil, benzyl methyl ketone; benzoins and substituted benzoins such as benzoin methyl ether, α-hydroxymethyl benzoin isopropyl ether; halogen containing compounds such as α-bromoacetophenone, p-bromoacetophenone, α-chloromethylnaphthalene; sulfur compounds such as aromatic disulfides; and other photosensitizers such as azides, thioketones, or mixture or synergistic mixtures thereof; the diaryl peroxides; the hydroperoxides; the peracids and peresters; and azo compounds; or any other known free radical initiator, such as di-t-butyl peroxide, benzoyl peroxide, 2,4-dichlorobenzoyl peroxide, t-butyl hydroperoxide, peroxyacetic acid, peroxybenzoic acid, t-butyl peroxypivalate, t-butyl peracetate, azobisisobutyronitrile, and the like.

The primer compositions of the instant invention may also optionally contain various flatting agents, surface active agents, thixotropic agents, and UV light absorbers. All of these additives and the use thereof are well known in the art and do not require extensive discussions. Therefore, only a limited number will be referred to, it being understood that any compounds possessing the ability to function in such a manner, i.e., as a flatting agent, surface active agent, UV light absorber, and the like, can be used so long as they do not deleteriously affect the photocuring of the primer compositions and do not adversely affect the non-opaque character of the coated polycarbonate article.

The various surface-active agents, including anionic, cationic and nonionic surface-active agents are described in *Kirk-Othmer Encyclopedia of Chemical Technology*, Vol. 19, Interscience Publishers, New York, 1969, pp. 507–593, and *Encyclopedia of Polymer Science and Technology*, Vol. 13, Interscience Publishers, New York, 1970, pp. 477–486, both of which are references and incorporated herein.

The ultraviolet light absorbing compounds which can optionally be present in an amount effective to protect the polycarbonate substrate from the degradative effects of ultraviolet light, provided that they do not unduly interfere with or hinder the photocuring of the primer compositions. Some non-limiting examples of suitable ultraviolet light absorbing compounds are benzophenone derivatives such as 2,2'-dihydroxybenzophenone, 2,2',4,4'-tetrahydroxybenzophenone, 2,2'-dihydroxy-4,4'-dimethoxybenzophenone, 2,2'-dihydroxy-4,4'-diethoxybenzophenone, 2,2'-dihydroxy-4,4'-dipropoxybenzophenone, 2,2'-dihydroxy-4,4'-dihydroxy-4,4'-dibutoxybenzophenone, 2,2'-dihydroxy-4-methoxy-4'-ethoxybenzophenone, 2,2'-dihydroxy-4-methoxy-4'-propoxybenzophenone, 2,2'-dihydroxy-4-methoxy-4'-butoxybenzophenone; and the like; and, benzotriazole derivatives such as 2-(2'-hydroxy-5'-methylphenyl)benzotriazole, 2-(2'-hydroxy-5'-tert-butylphenyl)benzotriazole, 2-(2'-hydroxy-3'-methyl-5'-tert-butylphenyl)benzotriazole, 2-(2'-hydroxy-5'-cyclohexylphenyl)-benzotriazole, 2-(2'-hydroxy-3',5'-dimethylphenyl) benzotriazole, and the like.

In the practice of the present invention, the photocurable compositions are first compounded by adding together the polyfunctional acrylic acid ester monomer, the organo silicon compound, the further curable acrylate modified polymer, the UV photoinitiator, and, optionally, any of the aforementioned additives. Additionally, if so desired to reduce the viscosity of the primer formulation, or to aid in solubilizing the organic silicon compound and/or the acrylate modified polymer, an organic solvent may be incorporated into the formulation. Generally, the amount of solvent, if any, present should be such that evaporation of the solvent occurs before any deleterious effect on the substrate due to the aggressiveness (in the chemical etching sense) of the primer compositions develops. The various components are thoroughly mixed so as to form a generally homogeneous primer composition. A thin, uniform film of the primer solution is then applied onto the polycarbonate surface by any of the known means such as dipping, spraying, roll-coating, and the like. Generally, the primer composition is applied in an amount sufficient to provide a cured film of from about 0.005 mil to about 0.5 mil, preferably from about 0.05 mil to about 0.2 mil thick. The primer film is then cured in an inert, e.g., nitrogen atmosphere, by UV irradiation which can have a wavelength of from 1849 A. to 4000 A. The lamp systems used to generate such radiation can consist of ultraviolet lamps which can consist of discharge lamps, as for example, xenon, metallic halide, metallic arc, such as low or high pressure mercury vapor discharge lamps, etc., having generating pressure of from as low as a few milli-torr up to about 10 atmospheres, can be employed. After UV curing, there is present on the surface of the polycarbonate a non-opaque primer which is adhered to the polycarbonate. This UV cured primer is the reaction product of the aforedescribed (i) polyfunctional acrylic acid ester monomer or mixtures of polyfunctional acrylic acid ester monomers; (ii) organic silicon compound or mixtures of organic silicon compounds; and, (iii) the acrylate modified polymers or mixtures of acrylate modified polymers.

While not wishing to be bound by any theory, it is believed that the cure of this primer composition occurs through the reaction of the polyfunctional acrylic acid ester monomers by means of the olefinic unsaturation with each other; (ii) through the reaction of the organic silicon compounds with each other by means of the olefinic unsaturation; (iii) by the reaction of the acrylate modified polymers with each other by means of the olefinic unsaturation of the acrylate group; (iv) by the reaction of the polyfunctional acrylic acid ester monomers and/or polymers with the organic silicon compounds and/or polymers thereof by means of the olefinic unsaturation present in each, and/or the reaction of said polyfunctional acrylic acid ester monomers and/or polymers with the acrylate modified polymer and/or the reaction products thereof by means of the olefinic unsaturation present in each, and/or the reaction, through the olefinic unsaturation of each, of the organic silicon compound and/or polymers thereof with the acrylate modified polymers and/or the reaction products thereof. The resulting reaction product is thermoset, hard, non-tacky, and is tenaciously adhered to the polycarbonate substrate.

The organopolysiloxane coating is applied onto this UV cured primer. In the practice of this invention, an organopolysiloxane coating composition containing a further curable organopolysiloxane is applied onto the cured primer and is then cured to form a thermoset organopolysiloxane coating.

The further-curable organopolysiloxane is generally the partial hydrolysis and condensation product of at least one compound represented by the general formula

$$R^6{}_n SiZ_{(4-n)} \qquad (VI)$$

wherein $R^6$ represents a monovalent hydrocarbon radical and a halogenated monovalent hydrocarbon radical, Z represents a hydrolyzable group, and n may vary between 0 and 2 inclusive, preferably between 0 and 1 inclusive.

More specifically, Z is independently a member such as halogen, alkoxy, acyloxy, and aryloxy.

Preferably, $R^6$ represents an alkyl radical containing from 1 to about 8 carbon atoms such as methyl, ethyl, and propyl through octyl (both normal and isomeric), an alkenyl radical containing from 2 to about 8 carbon atoms, such as vinyl and the normal and isomeric forms of propenyl through octenyl, and the phenyl radical; Z preferably represents an alkoxy radical containing from 1 to about 8 carbon atoms such as methoxy, ethoxy, propoxy, heptoxy, octoxy, and the like, an acyloxy radical containing from 2 to about 9 carbon atoms, such as acetoxy, propionoxy, butanoxy, pentanoxy, hexanoxy, and the like, and a phenoxy radical; and n varies from 0 to 2.

Preferred compounds of formula VI are silanes of the formula

$$R^7{}_a Si(OR^8)_{4-a} \qquad (VII)$$

and silanes of the formula

$$R^9{}_b Si(OCOR^{10})_{4-b} \qquad (VIII).$$

wherein $R^7$ and $R^9$ represent a monovalent hydrocarbon radical and a halogenated monovalent hydrocarbon radical, preferably an alkyl radical containing from 1 to about 8 carbon atoms, an alkenyl radical containing from 2 to about 8 carbon atoms, and the phenyl radical; $R^8$ and $R^{10}$ represent monovalent hydrocarbon radicals and halogenated monovalent radicals such as alkyl radicals and phenyl radicals, but are preferably alkyl radicals of 1 to 8 carbon atoms; a varies between 0 to 2 inclusive, preferably between 0 to 1 inclusive; and, b varies between 0 and 2 inclusive, preferably 0 to 1 inclusive.

Upon hydrolysis, the compounds of formula VI and more specifically those of formulae VII and VIII are converted to the corresponding silanols. Upon generation of the silanol, there is condensation of the hydroxyl substituents to form —Si—O—Si— bonding. The condensation is not complete, but rather the organopolysiloxane retains a quantity of silicon-bonded hydroxyl groups. This partial condensate can be characterized as a further-curable, i.e., further condensable, siloxanol polymer. During curing of the further-curable organopolysiloxane, which has been deposited on the primed polycarbonate substrate, the residual hydroxyls condense to give a thermoset organopolysiloxane.

The further-curable organopolysiloxane may be formulated into the top coat composition as a solution of the siloxanol polymer in water and alcohol by-product, as a concentrated solution of siloxanol in water and alcohol by-product by evaporating off a substantial quantity of the alcohol by-product and water, or it may be formulated into the top coat composition as a solid partially pre-cured product by evaporating off a substantial amount of alcohol by-product and water and then partially pre-curing and solidifying the concentrated product.

Examples of silicone top coats useful in the practice of the instant invention are the foregoing alkoxy and aryloxy functional silanes represented by formula VII and acyloxy functional silanes represented by formula VIII. Such alkoxy functional, aryloxy functional and acyloxy functional silanes are well known materials to silicone manufacturers and are easily obtainable. With respect to the acyloxy functional silanes, these materials are generally applied without any solvent since it has been found that the use of solvents in application of such top coat at times seriously degrades the applied silicone top coat. Preferably, the silanes of formula VIII, that is, the acyloxy functional silanes, are applied at 100% solids or from 20 to 100% solids. In the case of the acyloxy silanes where the solids are less than 100%, the silane is simply the water hydrolysis and partial condensation product of the foregoing acyloxy functional silanes of formula VIII. The alkoxy and aryloxy functional silanes of formula VIII are generally applied from a top coat composition containing solvents in a concentration of from about 20 to 95% by weight. Examples of solvents which may be used in the formulation of the top coat composition include methanol, ethanol, butanol, ethyl acetate, benzene, toluene, xylene, ethylene glycol, and the like. However, the alkoxy and aryloxy functional silanes may also, similarly to the acyloxy functional silanes, be applied from a top coat composition which contains no solvents other than the alcohol by-product and water used to form the partial hydrolysis and condensation products of these silanes.

With respect to the foregoing aryloxy functional, alkoxy functional and acyloxy functional silanes mentioned above, such materials are well known in the art as, for instance, in U.S. Pat. Nos. 3,888,815 and 3,701,753, both of which are incorporated herein by reference.

One particular class of further-curable organopolysiloxanes which are employed in the top coat compositions of the present invention are the partial hydrolysis and condensation products of alkoxy functional silanes, preferably alkyltrialkoxysilanes, preferably those alkyltrialkoxysilanes wherein the alkyl group contains from 1 to about 8 carbon atoms, and aryltrialkoxysilanes, preferably phenyltrialkoxysilanes, or mixtures thereof, wherein the alkoxy group contains from 1 to about 8 carbon atoms, such as, for example, methoxy, ethoxy, isopropoxy, butoxy, pentoxy, hexoxy, octoxy, and the like. These further-curable organopolysiloxanes are generally prepared by a process wherein the alkyltrialkoxysilane, aryltrialkoxysilane, or a mixture of alkyltrialkoxysilane and aryltrialkoxysilane is heated in the presence of water, wherein the molar ratio of water to total silane is at least about 1.5:1 and in the presence of an effective amount of a hydrolysis catalyst, such as a mineral acid, for example, HCl, for about 1 to about 10 hours at a temperature between ambient and reflux to produce a siloxane partial condensation product; the partial condensation product is then concentrated by heating to remove 50 to about 90 mole percent alkanol by-product and some water, and, thereafter, the concentrated partial condensation product is precured by heating at a temperature below the gel point thereof and generally in the range of about 70° to 300° C. to produce the solvent-soluble, further-curable organopolysiloxane. This precured solvent-soluble, further-curable organopolysiloxane is then dissolved in a suitable solvent to form the top coat composition and the primed polycarbonate substrate is then coated with this top coat composition. The solvent is then evaporated and the residual further-curable organopolysiloxane is cured to a thermoset state to provide a uniformly and tenaciously adhered top coat on the primed polycarbonate substrate. The curing is effected at elevated temperatures in the range of about 50° to 135° C. for times between about 1 hour to about 72 hours, depending on the temperature at which the cure is effected. The silicone top coat generally should be cured preferably at an elevated temperature to effect the proper cure but the temperature should be below the glass transition temperature of the polycarbonate. Of course, if the glass transition temperature of the polycarbonate is exceeded, then the polycarbonate part may become deformed and lose its utility.

One particular further-curable organopolysiloxane that can be employed in the top coat composition of the instant invention is the partial hydrolysis and condensation product of an alkyltrialkoxy, preferably methyltriethoxysilane. This further-curable organopolysiloxane is prepared by hydrolyzing methyltriethoxysilane with water in the presence of an effective amount of a hydrolysis catalyst, such as HCl, for about 1 to 10 hours at a temperature generally between 40° C. and reflux temperature, to produce a partial condensation product. This partial condensation product is then concentrated by heating to remove some of the alkanol by-product and water. This concentrated product is then partially pre-cured at a temperature of about 70° to about 300° C. and below the gel point thereof and then solidified to provide a solid, solvent-soluble, further-curable organopolysiloxane is then dissolved to a desired concentration in a suitable solvent to form the top coat composition. The top coat composition is then applied to the primed polycarbonate substrate, after which the solvent is evaporated and the further-curable organopolysiloxane finally cured to provide a hard, abrasion and chemical solvent resistant, thermoset organopolysiloxane top coat on the polycarbonate substrate.

Another further-curable organopolysiloxane which may be employed in the practice of the present invention is the partial hydrolysis and condensation product of a mixture of methyltriethoxysilane and phenyltriethoxysilane. This organopolysiloxane is prepared by hydrolyzing a mixture of methyltriethoxysilane and phenyltriethoxysilane with water in the presence of a hydrolysis catalyst such as HCl to produce a partial condensation product. This partial condensation product is then concentrated by heating to remove a substantial amount of the alkanol by-product and some water. This concentrated product is then partially pre-cured by heating and then solidified to provide a solid, solvent-soluble, further-curable organopolysiloxane. The solid, solvent-soluble, further-curable organopolysiloxane is then dissolved to a desired concentration in a suitable solvent to form the top coat composition containing a further-curable organopolysiloxane. The top coat composition is then applied to the primed polycarbonate substrate, after which the solvent is evaporated and the further-curable organopolysiloxane is finally cured to provide a tenaciously and durably adhered, abrasion and chemical resistant thermoset organopolysiloxane top coat on the polycarbonate substrate.

Yet another further-curable organopolysiloxane which may be employed in the practice of the present invention is the partial hydrolysis and condensation product of methyltrimethoxysilane. This organopolysiloxane is prepared by hydrolyzing at or below room temperature methyltrimethoxysilane with water in the presence of a hydrolysis catalyst such as HCl to produce a partial condensation product. This partial condensation product is then concentrated by removing a substantial amount of the alkanol by-product and some water. This concentrated product is then partially pre-cured to provide a solid, solvent-soluble, further-curable organopolysiloxane.

These are not the only silicones that may be utilized in the top coats of the instant invention. Less preferred silicones which can be partially hydrolyzed and condensed or dissolved in a solvent are, for instance, silicone resins composed of trifunctional and difunctional units, silicone resins composed of trifunctional and difunctional units, silicone resins composed of trifunctional units, difunctional units and tetrafunctional units where the organo substituent groups in the trifunctional units may be selected from hydrocarbon radicals of 1 to about 8 carbon atoms and are preferably methyl, phenyl, and vinyl; and wherein the organo substituent groups in the difunctional siloxy units may be selected from hydrocarbon units of from 1 to about 8 carbon atoms, preferably alkyl radicals, vinyl radicals, and phenyl radicals. Such silicone resins usually have an organic to silicon atom ratio of 1:1 to 1.9:1, may have a silanol content that varies anywehre from 4 to 10 weight percent, and optionally may have an alkoxy content that varies from 2 to 4%. The preparation of such silicone resins which may be utilized as top coats in the invention of the instant case are, for instance, to be found in U.S. Pat. Nos. 3,375,223, 3,435,001, 3,450,672, 3,790,527, 3,832,319, 3,865,766, 3,887,514 and 3,925,276.

These silicones may also contain fillers such as, for example, glass, talc, and silica, preferably colloidal silica.

The top coat compositions containing the aforedescribed silicones are simply brushed, dipped, sprayed, or flowed on top of the primer layer that is applied to the polycarbonate substrate. The solvent, or alcohol by-product and water, present in the top coat composition is evaporated and the residual further-curable organopolysiloxane is cured to form a thermoset organopolysiloxane top coat. Preferably, the further-curable organopolysiloxane is cured at elevated temperatures. Although certain catalysts may be utilized to accelerate the cure of the further-curable organopolysiloxane, such catalysts are not necessary if the further-curable organopolysiloxane is cured by itself at the elevated temperature for a sufficient length of time.

The thickness of the top coat generally is dependent upon the method of application and upon the weight percent solids present in the further-curable organopolysiloxane top coat composition. In general, the higher the percent solids and the longer the application time, the greater the thickness of the top coat. It is preferred that the cured top coat have a thickness of from about 0.1 to about 0.5 mils, more preferably from 0.15 to about 0.4 mils, and most preferably from about 0.2 to about 0.25 mils.

Another embodiment of the instant invention is a process of producing a polycarbonate article having a tenaciously adhered organopolysiloxane coating thereon. This process comprises: (i) applying a UV curable primer composition containing (a) a polyfunctional acrylic acid ester monomer or mixtures thereof, (b) an organic silicon compound or mixtures thereof, (c) an acrylate modified polymer, and (d) a UV photoinitiator to a polycarbonate substrate; (ii) curing said primer composition by means of ultraviolet light; (iii) applying an organopolysiloxane top coating composition containing a further-curable organopolysiloxane to said cured primer; and (iv) curing said further-curable organopolysiloxane to form a thermoset organopolysiloxane top coating.

PREFERRED EMBODIMENT OF THE INVENTION

In order to more fully and clearly illustrate the present invention, the following specific examples are presented. It is intended that the examples be considered as illustrative rather than limiting the invention disclosed and claimed herein.

EXAMPLE 1

An aromatic polycarbonate is prepared by reacting 2,2-bis(4-hydroxyphenyl)propane and phosgene in the presence of an acid acceptor and a molecular weight regulator and having an intrinsic viscosity of 0.57. The product is then fed to an extruder, which extruder is operated at about 205° C. and the extrudate is comminuted into pellets.

The pellets are then injection molded at about 315° C. into test panels of about 4 in. by 4 in. by about ⅛ in. thick.

EXAMPLE 2

A primer coating composition is prepared by blending 10 parts by weight of Uvimer 545 resin (an acrylated urethane polymer derived from 2,4-toluene diisocyanate, hydroxy ethyl acrylate, and pentaerythritol triacrylate) sold by Polychrome Corp., 10 parts by weight of diethyleneglycol diacrylate, 10 parts by weight of a 50% ethanolic solution of N-[3-(triethoxysilyl)propyl] maleamic acid which has been aged, i.e., allowed to stand for an extended period of time, 2 parts by weight of resorcinol monobenzoate, and ½ part by weight of, -diethoxyacetophenone. This blend is diluted with isobutanol to give a final solution having a weight to volume percent of 2% of said blend in 98% of isobutanol.

A wet film 23 mils in thickness of this primer composition is applied to polycarbonate panels prepared in accordance with Example 1. After evaporation of the solvent, the primer film, being about 0.46 mils in thickness, is cured by passing the coated polycarbonate panels through a combination Linde photo-curing apparatus which consists of a variable speed conveyor running through a chamber containing germicidal-type mercury vapor lamps which emit light mainly at 2537 A°, 3150 A°, and 3605 A°, wherein the nitrogen pressure is 25 psi nitrogen and the speed of the conveyor is 30 ft./min.

EXAMPLE 3

The primed polycarbonate panels prepared in accordance with Example 2 are coated with an organopolysiloxane coating composition containing a further-curable organopolysiloxane and an alkanol solvent, the further-curable organopolysiloxane being a hydrolysis and partial condensation product of methyltriethoxysilane. After the organopolysiloxane coating composition is applied to the primed surface of the polycarbonate panels, the coated panels are air dried for 30 minutes to evaporate the solvent, and are then baked for one hour at 250° F. to cure the organopolysiloxane.

While the invention has been described above with particularity, it will, of course, be apparent that modifications may be made which, pursuant to the patent statues and laws, do not depart from the scope of the instant invention.

What I claim as new and desire to secure by Letters Patent of the United States is:

1. A polycarbonate article having improved scratch, mar, abrasion and chemical solvent resistance comprising a polycarbonate substrate having deposited on at least one surface thereof: (i) an ultraviolet radiation cured primer layer which contains the photoreaction products of (a) at least one polyfunctional acrylic acid ester monomer, (b) at least one acrylate modified polymer selected from the group consisting of acrylated epoxies, acrylated urethanes, acrylated alkyl urethanes, acrylated polycaprolactones, acrylated unsaturated acid modified drying oils, acrylated polyesters, and acrylated polyethers, and (c) at least one organic silicon compound represented by the general formula $R^4_c SiX_{4-c}$ wherein c is an integer from 1 to 3 inclusive, X is an alkoxy, acyloxy, or aryloxy radical, and $R^4$ represents a radical selected from

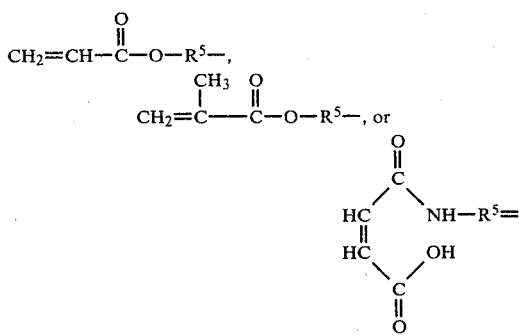

wherein $R^5$ is a divalent saturated aliphatic hydrocarbon radical; and (ii) having deposited on said primer layer a cured top coat containing a thermoset organopolysiloxane.

2. The article of claim 1 wherein said polyfunctional acrylic acid ester monomer is represented by the formula

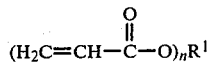

wherein n is an integer from 2 to 4 inclusive and $R^1$ is selected from an n valent saturated aliphatic hydrocarbon radical, n valent substituted saturated aliphatic hydrocarbon radical, n valent olefinically unsaturated aliphatic hydrocarbon radical, n valent substituted olefinically unsaturated aliphatic hydrocarbon radical, n valent ether radical, n valent substituted ether radical, n valent polyether radical, n valent substituted polyether radical, n valent aromatic hydrocarbon radical, and n valent substituted aromatic hydrocarbon radical.

3. The article of claim 2 wherein $R^1$ is selected from an n valent saturated aliphatic hydrocarbon radical, n valent olefinically unsaturated aliphatic hydrocarbon radical, n valent ether radical, n valent polyether radical, and n valent aromatic hydrocarbon radical.

4. The article of claim 3 wherein $R^1$ is selected from an n valent saturated aliphatic hydrocarbon radical, n valent ether radical, and n valent polyether radical.

5. The article of claim 4 wherein said acrylate modified polymer is an acrylated urethane.

6. The article of claim 1 wherein $R^4$ represents a radical having the formula

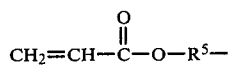

wherein $R^5$ is a divalent saturated aliphatic hydrocarbon radical.

7. The article of claim 6 wherein X is an alkoxy radical and c is 1.

8. The article of claim 7 wherein said alkoxy radical is an ethoxy radical.

9. The article of claim 7 wherein said alkoxy radical is a methoxy radical.

10. The article of claim 1 wherein $R^4$ represents a radical having the formula

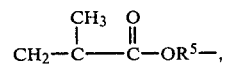

wherein $R^5$ is a divalent saturated aliphatic hydrocarbon radical.

11. The article of claim 10 wherein X is an alkoxy radical and c is 1.

12. The article of claim 11 wherein said alkoxy radical is an ethoxy radical.

13. The article of claim 11 wherein said alkoxy radical is a methoxy radical.

14. The article of claim 1 wherein $R^4$ represents a radical having the formula

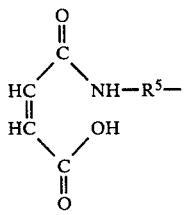

wherein $R^5$ is a divalent saturated aliphatic hydrocarbon radical.

15. The article of claim 14 wherein X is an alkoxy radical and c is 1.

16. The article of claim 15 wherein said alkoxy radical is a methoxy radical.

17. The article of claim 15 wherein said alkoxy radical is an ethoxy radical.

18. A process for producing a uniformly and tenaciously adhered scratch resistant, mar resistant, abrasion resistant, and organic solvent resistant thermoset organopolysiloxane containing coating on at least one surface of a polycarbonate substrate which comprises: (i) applying onto at least one surface of said polycarbonate substrate an ultraviolet light curable primer composition containing (a) at least one polyfunctional acrylic acid ester monomer; (b) at least one organic silicon compound containing at least one organic group having olefinic unsaturation; (c) at least one acrylate modified polymer selected from the group consisting of acrylated urethanes, acrylated alkyl urethanes, acrylated polycaprolactones, acrylated unsaturated acid modified drying oils, acrylated polyesters, and acrylated polyethers; and (d) a photoinitiator; (ii) curing said primer composition by means of ultraviolet light; (iii) applying an organopolysiloxane top coating composition containing a further-curable organopolysiloxane onto said cured primer; and (iv) curing said further-curable organopolysiloxane to a thermoset condition and thereby producing said coating.

19. The process of claim 18 wherein said organic silicon compound is represented by the general formula $$R^4_c SiX_{4-c}$$

wherein c is an integer from 1 to 3 inclusive, X is an alkoxy, acyloxy, or aryloxy radical, and $R^4$ is a compound represented by the formula

$$CH_2=\overset{Y}{\underset{|}{C}}-COO-R^5-, \text{ and}$$

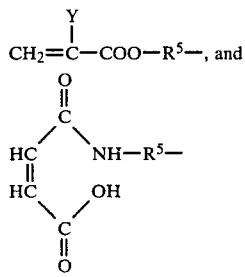

wherein Y is a hydrogen or methyl, and $R^5$ is a divalent saturated aliphatic hydrocarbon radical.

20. The process of claim 19 wherein said polyfunctional acrylic acid ester monomer is represented by the formula $$(CH_2=CH-COO)_n R^1$$

wherein n is an integer from 2 to 4 inclusive, and $R^1$ is selected from an n valent saturated aliphatic hydrocarbon radical, n valent substituted saturated aliphatic hydrocarbon radical, n valent olefinically unsaturated aliphatic hydrocarbon radical, n valent substituted olefinically unsaturated aliphatic hydrocarbon radical, n valent ether radical, n valent substituted ether radical, n valent polyether radical, n valent substituted polyether radical, n valent aromatic hydrocarbon radical, and n valent substituted aromatic hydrocarbon radical.

21. The process of claim 20 wherein $R^1$ is selected from a n valent saturated aliphatic hydrocarbon radical, n valent olefinically unsaturated aliphatic hydrocarbon radical, n valent ether radiacal, n valent polyether radical, and n valent aromatic hydrocarbon radical.

22. The process of claim 21 wherein $R^1$ is selected from a n valent saturated aliphatic hydrocarbon radical, n valent ether radical, and n valent polyether radical.

23. The process of claim 22 wherein said acrylate modified polymer is an acrylated urethane.

24. The process of claim 20 wherein $R^4$ is a compound represented by the formula

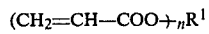
$$CH_2=CH-COO-R^5-$$

wherein $R^5$ is a divalent saturated aliphatic hydrocarbon radical.

25. The process of claim 24 wherein X is an alkoxy radical and c is 1.

26. The process of claim 20 wherein $R^4$ is a compound represented by the formula

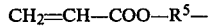
$$CH_2=\overset{CH_3}{\underset{|}{C}}-COO-R^5-$$

wherein $R^5$ is a divalent saturated aliphatic hydrocarbon radical.

27. The process of claim 26 wherein X is an alkoxy radical and c is 1.

28. The process of claim 20 wherein $R^4$ is a compound represented by the formula

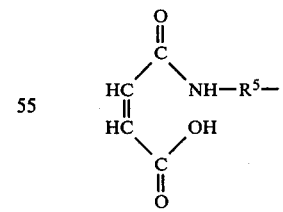

wherein $R^5$ is a divalent saturated aliphatic hydrocarbon radical.

29. The process of claim 28 wherein X is an alkoxy radical and c is 1.

* * * * *